June 12, 1962   S. K. STAUTH   3,038,591
CARRIAGES FOR ELEVATING CONVEYORS
Filed March 6, 1961
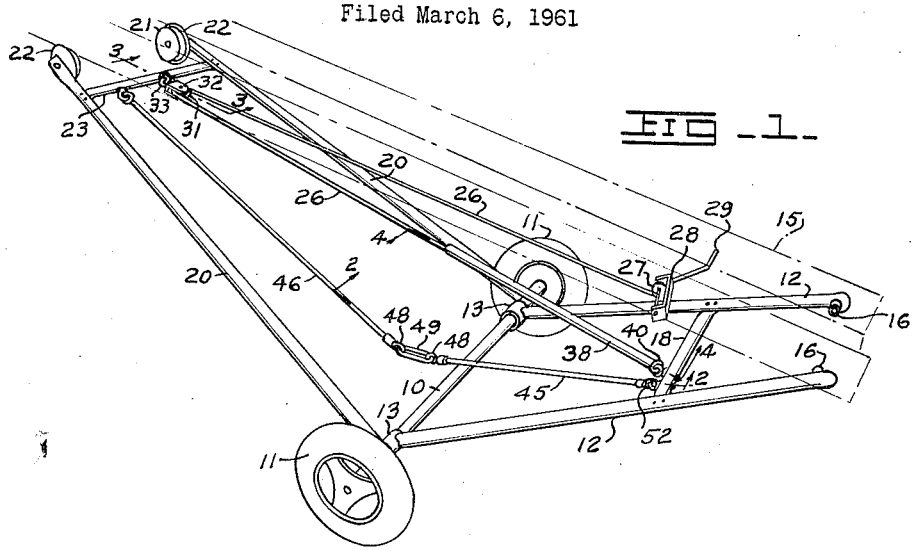
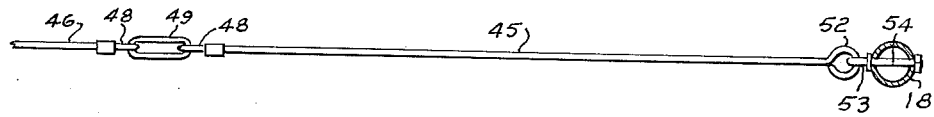
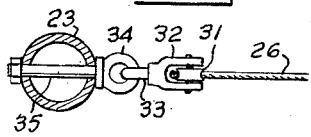
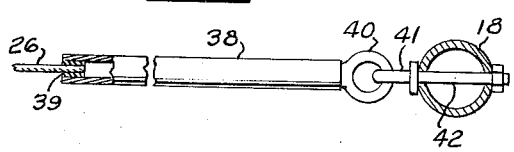
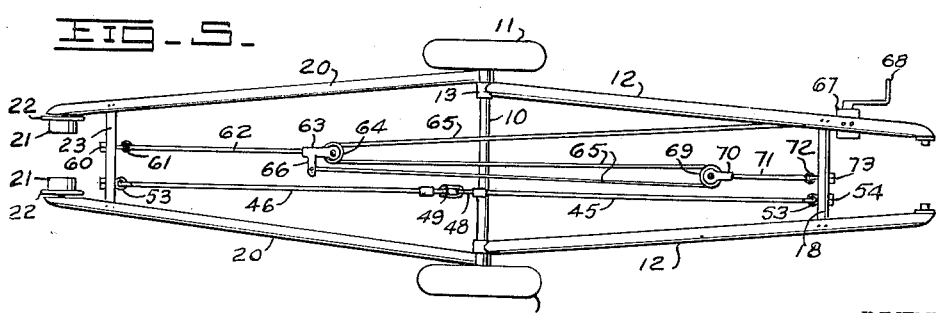
INVENTOR
S. K. STAUTH
BY Homer R. Montague
ATTORNEY

United States Patent Office 3,038,591
Patented June 12, 1962

3,038,591
CARRIAGES FOR ELEVATING CONVEYORS
Samuel K. Stauth, Compton, Ill., assignor to Mayrath
Company, a corporation of Illinois
Filed Mar. 6, 1961, Ser. No. 93,752
11 Claims. (Cl. 198—233)

This invention relates to carriages for elevating conveyors.

An important object of the invention is to provide a carriage of the type employing radius rods and supporting arms projecting in opposite directions from a wheeled axle assembly with means carried by the radius rods and supporting arms for supporting the trough of a conveyor thereon while permitting variation in the angularity between the radius rods and supporting arms to vary the angle to the horizontal of the conveyor trough, and to provide in conjunction therewith novel means for limiting the angle between the radius rods and supporting arms to a maximum to prevent them from assuming a position in a common plane or on dead-center with respect to each other, thus making it difficult to pull the ends of the radius rods and supporting arms toward each other when desired.

A further object is to provide such a means as a safety means in connection with a structure of this character, which means is of such nature that when the radius rods and supporting arms are adjusted at an angle with respect to each other less than the maximum determined by the limiting means, such means will drop down out of the way and will remain inoperative until called upon to perform its intended function.

A further object is to provide novel means for exerting a pull on opposite ends of the radius rods and supporting arms to adjust the angularity therebetween and thus adjust the angle of the conveyor trough, and to provide means in conjunction with the pull-exerting means for limiting the minimum angularity between the radius rods and supporting arms to prevent the latter from moving beyond a vertical position from which it would fall over to the opposite side over the radius rods.

A further object is to provide novel means of the character referred to in the form of pulley and cable winding means and to provide in conjunction therewith two elements which are adapted to contact with each other to limit the angle between the radius rods and supporting arms for the purpose stated.

Other objects and advantages of the invention will become apparent during the course of the following description.

In the drawing I have shown two embodiments of the invention. In this showing:

FIGURE 1 is a perspective view of the carriage with a conveyor trough shown in position thereon in broken lines;

FIGURE 2 is an enlarged fragmentary section on line 2—2 of FIGURE 1;

FIGURE 3 is a similar view on line 3—3 of FIGURE 1;

FIGURE 4 is a similar view on line 4—4 of FIGURE 1; and

FIGURE 5 is a plan view of a modified form of the invention.

Referring to FIGURE 1, the numeral 10 designates an axle assembly preferably including a tubular body provided at its ends with supporting wheels 11. Radius rods 12 project in one direction from the axle 10 and converge toward their free ends so that the latter are in position to support a conveyor trough while the ends connected to the axle are relatively widely spread for stability. Any suitable means may be provided for connecting the radius rods 12 to the axle. In the present case the end of each radius rod associated with the axle is welded or otherwise secured to a sleeve 13 rotatably surrounding the axle 10.

The conveyor trough 15 has one end rotatably supported by the free ends of the radius rods 12. To this end, the radius rods are provided with inwardly projecting trunnions 16 adapted to project through suitable openings in the sides of the conveyor trough 15. Such end of the conveyor trough thus will be pivotally supported with respect to the radius rods and fixed against longitudinal movement by the trunnions 16.

Inwardly of the free ends thereof, the radius rods are provided with a cross brace 18 bolted or otherwise secured to the radius rods. This brace not only increases the rigidity of the radius rods but also fixes the trunnions against outward movement, thus maintaining them in engagement with the side walls of the trough. This brace, of course, is fixed to the radius rods after the mounting of the trough 15 on the trunnions 16.

The other end of the conveyor trough is supported through the medium of supporting arms 20, the inner or lower ends of which may be connected in any suitable manner to the axle 10, for example by welding thereto. In such case, the axle 10 turns with the supporting arms 20 as the latter are adjusted upwardly or downwardly to change their angle relative to the radius rods 12. This, however, does not affect the radius rods since the latter are pivoted to the axle 10 by the sleeves 13.

The ends of the supporting arms 20 remote from the axle 10 are provided with supporting wheels 21 having flanges 22 between which the conveyor trough 15 is arranged to be supported by the rollers 21. Adjacent their free ends, the supporting arms 20 are connected by a cross brace 23 bolted or otherwise secured to the supporting arms.

Means is provided for exerting a pull between the cross braces 18 and 23 to move them toward each other to decrease the angle between the radius rods and supporting arms, or for increasing such angle by releasing the pull on the cross braces. This pull is exerted primarily through the medium of a cable 26 connected at one end to a reel 27 carried by a frame 28 secured in any suitable manner to one of the radius rods 12. The reel 27 is rotatable by a handle 29 and any suitable ratchet or similar means may be employed for fixing the reel 27 against rotation whenever desired.

From the reel 27 the cable 26 extends toward the cross brace 23 and passes around a pulley 31 carried by a yoke 32 having a loop 33 connected to the eye 34 of a bolt 35 passing through the cross brace 23 (FIGURE 3). From the pulley 31, the cable 26 extends forwardly toward the brace 18. Referring to FIGURE 4, it will be noted that the end of the cable is connected to a rigid elongated member 38 which may be in the form of a tube. The cable is connected to the tube in any suitable manner, for example by welding it to a sleeve 39 which may be welded to the tube 38 or fixed therein by swaging the end of such tube into tight engagement with the sleeve 39. The forward end of the tube 38 is provided with an eye 40, welded or otherwise secured thereto, and connected to the eye 41 of a bolt 42 passing through the cross brace 18. As pointed out below, movement of the cross braces 18 and 23 toward each other and consequently the minimum angularity between the radius rods 12 and supporting arms 20 is limited by engagement of the rigid member 38 with the pulley 31 or yoke 32.

Novel safety means is provided for limiting movement of the braces 18 and 23 away from each other to prevent relative movement of the radius rods 12 and supporting arms 20 to positions that are too nearly in a common plane. Referring to FIGURES 1 and 2, the numerals 45 and 46 designate a pair of rods having adjacent ends provided with loops 48 connected by a loop 49 which may be in the form of an ordinary chain link. The remote ends of the rods 45 and 46 are connected respectively to the cross braces 18 and 23 and since the connecting means employed may be identical, only one has been illustrated in detail in FIGURE 2. The forward end of the rod 45 is shown as being bent to provide an eye 52 engageable with the eye 53 of a bolt 54 passing through the cross brace 18. Since such means at the remote end of the rod 46 are identical, the parts thereof have been indicated by the same reference numerals.

The form of the invention shown in FIGURE 5 is preferably employed for longer and heavier carriages to provide a suitable mechanical advantage whereby the winding reel employed with the cable may be manually operated. Since the frame elements, conveyor trough supporting trunnions, cross braces, etc. may be identical in structure with those described above, they have been indicated by the same reference numerals. The cross brace 23 in this case is provided with an eye bolt 60 to which is connected an eye formed on one end of a rod 62. The other end of this rod is welded or otherwise connected to a pulley yoke 63 carrying a pulley 64 about which passes a cable 65. The yoke 63 may be provided with a laterally extending arm 66 for a purpose to be described.

One end of the cable 65 is connected to a reel assembly 67 similar to the corresponding assembly shown in FIGURE 1, the reel being rotatable by a handle 68 to exert a pull on or to release the end of the cable 65. From the reel assembly, the cable 65 passes around the pulley 64 and then around another pulley 69 carried by a yoke 70 fixed to one end of a rod 71. The other end of this rod is bent to form an eye 72 connected to an eye bolt 73 fixed to the cross brace 18. After passing around the pulley 68, the cable 65 has its other end anchored to the arm 66.

The form of the invention shown in FIGURE 5 is also provided with means for limiting movement of the cross braces 18 and 23 away from each other. Since such means may be identical with the corresponding means in FIGURES 1 and 2, the parts thereof have been indicated by the same numerals.

*Operation*

The parts of the carriage may be shipped knocked down and assembled at the site of use. The brace 18 is bolted in position, as stated above, after the lower or forward end of the conveyor trough has been connected to the trunnions 16.

When it is desired to lift to a higher elevation the upper or left-hand end of the trough 15 as shown in FIGURE 1, the handle 29 is turned to wind the cable 26 on the reel, and this action obviously pulls the braces 18 and 23 toward each other. When the desired angularity of the conveyor trough has been reached, suitable means (not shown) is employed for preventing reverse rotation of the reel 27. The handle 29 is rotated in the opposite direction if it is desired to lower the wheels 21 and thus lower the upper end of the conveyor trough.

It is desired to limit the upward swinging movement of the supporting arms 20 since, if these arms swing upwardly to and slightly beyond a vertical position, they will drop by gravity over the radius rods 12, thus resulting in the damaging of the parts. The lifting means for the free ends of the supporting arms functions to limit to a minimum the angle between the radius rods 12 and supporting arms 20 to prevent the result referred to. If the operator turns handle 29 to swing the supporting arms upwardly to elevate the higher end of the conveyor trough to its maximum extent, a point will be reached in which the taking-up of the cable 26 between pulley 31 and rigid member 38 will cause the rear end of the latter to engage the pulley structure, thus preventing further turning of the winding reel. Thus the structure shown constitutes a safety factor which prevents an operator, who is not watching the angularity of the supporting arms 20, from moving such arms to or beyond the vertical.

The rods 45 and 46 and associated elements serve to prevent the movement of the radius rods 12 and supporting arms 20 to an angle too close to 180° from each other, in which case they would lie in or near a common plane and too much strain would be placed on the parts if an effort were made to turn the reel crank 29 to lift the wheels 21. This result can occur in a number of different ways, for example by an operator lowering the supporting arms too far; by failure of the ratchet mechanism associated with the reel, which would permit the weight of the parts at the upper end of the structure to unwind the cable, by the breaking of the cable, etc. The total length of the rod structure between the eyes 41 carried by the braces 18 and 23 is such that the rods 45 and 46 will assume positions in alignment with each other to limit movement of the braces 18 and 23 away from each other before the radius rods 12 and supporting arms 20 reach positions in a common plane. This occurs regardless of the reason why the arms 20 move downwardly, and thus the rods 45 and 46 serve as a safety feature to prevent the undesirable result referred to. Whenever the angle between the radius rods 12 and 20 is less than the maximum predetermined by the limiting means referred to, such means drops downwardly by gravity out of the way, as shown in FIGURE 1.

The form of the invention shown in FIGURE 5 is preferably used to provide a mechanical advantage permitting the adjusting of the radius rods 12 and supporting arms 20 manually by an operator. This form of the invention does not provide the rigid member 38 but the construction accomplishes the same results. The pulleys 64 and 69 are so spaced that when they meet when raising the supporting arms 20, the latter will have reached their desired maximum lifting position and engagement of the two pulleys 64 and 69 prevents further lifting movement. These two pulleys therefore function in exactly the same manner as the pulley 31 and tube 38 of the form of the invention described above.

From the foregoing it will be apparent that the novel features of the present construction, used with the type of conveyor elevator referred to, serve to limit relative movement of the radius rods 12 and supporting arms 30 in both directions, thus providing a highly desirable minimum possible angle between the elements referred to and a maximum possible angle. These two means thus constitute important safety devices in a structure of this character.

It is to be undertsood that the forms of the invention shown and described are to be taken as preferred examples of the same, and that various changes in the shape, size, and arrangement of the parts may be made as do not depart from the spirit of the invention or the scope of the appended claims.

What is claimed is:

1. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and supporting arms having means for supporting a conveyor thereon, means connected between said cross braces for varying the distance therebetween to vary the angularity between said radius rods and supporting arms to determine the angle of the conveyor, and means for limiting movement of said cross braces away from each other to limit to a predetermined maximum of less than 180° the angle between said radius rods and said supporting arms.

2. A carriage according to claim 1 wherein said means for limiting movement of said cross braces away from each other comprises rigid members each having one end connected to one of said cross braces and having their other ends in proximity to each other, and means for connecting said other ends of said members to permit them to swing downwardly when the angle between said radius rods and said supporting arms is less than the angle predetermined by said limiting means.

3. A carriage according to claim 1 wherein said means for limiting movement of said cross braces away from each other comprises rigid members each having one end connected to one of said cross braces and having their other ends in proximity to each other, eyes carried by the other ends of said rigid members, and a link connecting said eyes to each other whereby said other ends of said rigid members are free to swing downwardly when the angle between said radius rods and said supporting arms is less than the maximum angle predetermined by said limiting means.

4. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and supporting arms having means for supporting a conveyor thereon, means connected between said cross braces for varying the distance therebetween to vary the angularity between said radius rods and supporting arms to determine the angle of the conveyor, and means forming a part of the means for varying the distance between said cross braces for limiting the minimum angle between said radius rods and said supporting arms to prevent the latter from swinging over and past the vertical plane of said axle structure.

5. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and supporting arms having means for supporting a conveyor thereon, means connected between said cross braces for varying the distance therebetween to vary the angularity between said radius rods and supporting arms to determine the angle of the conveyor, said means for varying the distance between said cross braces comprising a cable and at least one pulley, and rigid means engageable with said pulley for limiting movement of said cross braces toward each other to limit the minimum angle between said radius rods and supporting arms to prevent the latter from swinging upwardly to or beyond the vertical plane of said axle structure.

6. A carriage according to claim 5 wherein said rigid means comprises an elongated member fixed at one end to one end of said cable and having pivotal connection at its other end to one of said cross braces, said pulley having a yoke pivotally connected to the other cross brace.

7. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and supporting arms having means for supporting a conveyor thereon, means connected between said cross braces for varying the distance therebetween to vary the angularity between said radius rods and supporting arms to determine the angle of the conveyor, means forming a part of the means for varying the distance between said cross braces for limiting the minimum angle between said radius rods and said supporting arms to prevent the latter from swinging over and past the vertical plane of said axle structure, and means connected between said cross braces to limit movement thereof away from each other to predetermine a maximum angle between said radius rods and said supporting arms to less than 180°.

8. A carriage according to claim 7 wherein said means for limiting movement of said cross braces away from each other comprises a pair of rods each pivotally connected at one end to one of said cross braces, the other ends of said rods being arranged adjacent each other, and a link connecting said other ends of said rods whereby they drop downwardly when the angle between said radius rods and said supporting arms is less than said predetermined maximum.

9. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and said supporting arms having means for supporting a conveyor thereon, means connected between said cross braces for varying the distance therebetween to vary the angularity between said radius rods and said supporting arms to determine the angle of the conveyor, said means for varying the distance between said cross braces comprising a cable and at least one pulley, rigid means engageable with said pulley for limiting movement of said cross braces toward each other to limit the minimum angle between said radius rods and said supporting arms to prevent the latter from swinging upwardly to or beyond the vertical plane of said axle structure, and means for limiting movement of said cross braces away from each other to predetermine a maximum angle of less than 180° between said radius rods and said supporting arms.

10. A carriage for an elevating conveyor comprising a wheeled axle structure, radius rods mounted at one end on said axle structure for turning movement about the axis thereof and projecting in one direction therefrom, a pair of supporting arms connected at one end to said axle structure and projecting in the other direction therefrom, cross braces connected between said radius rods and said supporting arms at points remote from said axle structure, the remote ends of said radius rods and supporting arms having means for supporting a conveyor thereon, means connected between said cross braces for varying the distance therebetween to vary the angularity between said radius rods and supporting arms to determine the angle of the conveyor, said means comprising a pulley having a supporting yoke connected to each of said cross braces, a cable passing around said pulleys, one end of said cable passing from one of said pulleys and having its other end fixed to the yoke of the other pulley, a reel connected to the other end of said cable and anchored to one of said radius rods, said pulleys being so spaced from each other as to move into contact with each other to prevent further pulling movement of said cable by said reel to predetermine the minimum angle between said radius rods and said supporting arms to prevent the latter from swinging upwardly to or beyond a position in the vertical plane of said axle structure, and means connected between said cross braces for limiting movement of the latter away from each other to predetermine a maximum angle of less than 180° between said radius rods and said supporting arms.

11. A carriage according to claim 10 wherein said means for limiting movement of said cross braces away from each other comprises a pair of rods having remote ends respectively connected to said cross braces and adjacent ends linked to each other to swing freely downwardly when the angle between said radius rods and said supporting arms is less than said predetermined maximum.

References Cited in the file of this patent

UNITED STATES PATENTS

| | | |
|---|---|---|
| 1,067,450 | Welch | July 15, 1913 |
| 1,558,300 | Searles | Oct. 20, 1925 |
| 1,589,495 | Wentz | June 22, 1926 |
| 2,718,296 | Johnson | Sept. 20, 1955 |